(12) United States Patent
Azad

(10) Patent No.: US 8,971,189 B2
(45) Date of Patent: Mar. 3, 2015

(54) LABEL SWITCHED PATH OAM WRAPPER

(75) Inventor: Mina Azad, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 511 days.

(21) Appl. No.: 13/212,327

(22) Filed: Aug. 18, 2011

(65) Prior Publication Data

US 2011/0299405 A1      Dec. 8, 2011

Related U.S. Application Data

(63) Continuation of application No. 12/110,677, filed on Apr. 28, 2008, now Pat. No. 8,024,457, which is a continuation of application No. 10/032,014, filed on Dec. 31, 2001, now Pat. No. 7,373,401.

(51) Int. Cl.
   *H04L 12/26*     (2006.01)
   *H04L 12/24*     (2006.01)
   *H04L 12/723*    (2013.01)

(52) U.S. Cl.
   CPC ............... *H04L 41/12* (2013.01); *H04L 41/04* (2013.01); *H04L 45/50* (2013.01)
   USPC ..................... 370/236.1; 370/241.1; 370/389; 709/224; 709/238

(58) Field of Classification Search
   USPC ............. 370/241.1, 389, 236.2; 709/224, 236
   See application file for complete search history.

(56) References Cited

U.S. PATENT DOCUMENTS

| | | | |
|---|---|---|---|
| 6,049,530 A | 4/2000 | Petersen et al. | |
| 6,078,815 A | 6/2000 | Edwards | |
| 6,341,127 B1 | 1/2002 | Katsube et al. | |
| 6,408,001 B1 | 6/2002 | Chuah et al. | |
| 6,545,979 B1 | 4/2003 | Poulin | |
| 6,574,224 B1 | 6/2003 | Brueckheimer et al. | |
| 6,665,273 B1 | 12/2003 | Goguen et al. | |
| 6,683,874 B1 | 1/2004 | Nagami et al. | |
| 6,721,269 B2 | 4/2004 | Cao et al. | |
| 6,731,639 B1 | 5/2004 | Ors et al. | |
| 6,735,190 B1 | 5/2004 | Chuah et al. | |
| 6,778,498 B2 * | 8/2004 | McDysan ..................... | 370/231 |
| 6,813,242 B1 | 11/2004 | Haskin et al. | |

(Continued)

OTHER PUBLICATIONS

Calle et al., "A Dynamic Multilevel MPLS Protection Domain", 3rd Int'l Wksp. Design of Reliable Commun. Networks, Budapest, Hungary, Oct. 2001.

(Continued)

*Primary Examiner* — Phuc Tran
(74) *Attorney, Agent, or Firm* — Christopher & Weisberg, P.A.

(57) ABSTRACT

Methods and devices for logically segmenting an LSP so that OAM DTUs may be used to determine the performance and/or the status of LSP segments. To segment a previously determined LSP, a dedicated subpath (a logical LSP) within that predetermined LSP is defined between two LSRs that are capable of processing OAM DTUs. The source node (source LSR) establishes a logical LSP between itself and the destination node (destination LSR) using an LDP. In doing this, the logical LSP traverses a specific path and transits through specific nodes in that path. The source node then transmits an OAM DTU or any other specialized DTU to the destination node using a label specifically associated with the logical LSP that was established. The characteristic of the specific path traversed by the logical LSP can thus be determined by when, how, and if the specialized DTU is received by the destination node.

29 Claims, 4 Drawing Sheets

(56) References Cited

U.S. PATENT DOCUMENTS

| | | |
|---|---|---|
| 6,885,677 B1 | 4/2005 | Klevans |
| 6,904,018 B2 | 6/2005 | Lee et al. |
| 6,947,428 B1 | 9/2005 | Andersson et al. |
| 6,973,504 B2 | 12/2005 | Nomura |
| 6,985,447 B2 | 1/2006 | Gibson et al. |
| 7,012,933 B2 | 3/2006 | Mark et al. |
| 7,302,494 B2* | 11/2007 | Hayashi et al. ............... 709/239 |
| 7,319,700 B1* | 1/2008 | Kompella .................... 370/400 |
| 7,373,401 B1* | 5/2008 | Azad ............................ 709/224 |
| 8,024,457 B2* | 9/2011 | Azad ............................ 709/224 |
| 2001/0026549 A1 | 10/2001 | Hameleers et al. |
| 2001/0033574 A1 | 10/2001 | Enoki et al. |
| 2002/0071390 A1 | 6/2002 | Reeves et al. |
| 2002/0083174 A1* | 6/2002 | Hayashi et al. ............... 709/225 |
| 2002/0143849 A1 | 10/2002 | Newell et al. |
| 2003/0053463 A1 | 3/2003 | Vikberg et al. |
| 2003/0063613 A1* | 4/2003 | Carpini et al. ................ 370/401 |
| 2003/0088699 A1 | 5/2003 | Luciani et al. |
| 2003/0112760 A1 | 6/2003 | Puppa et al. |
| 2003/0115480 A1* | 6/2003 | McDysan .................... 713/201 |
| 2003/0117950 A1 | 6/2003 | Huang |
| 2003/0118019 A1 | 6/2003 | Mark et al. |

OTHER PUBLICATIONS

Rosen et al., "Multiprotocol Label Switching Architecture", RFC 3031, Jan. 2001.

Awduche et al., "Requirements for Traffic Engineering Over MPLS", RFC 2702, Sep. 1999.

Rodriguez et al., "TCP/IP Tutorial Technical Overview", IBM, Aug. 6, 2001.

Villamizar, MPLS Optimized Multipath (MPLS-OMP) UUNET, Feb. 25, 1999.

Andersson et al., "LDP Specification", RFC 3036, Jan. 2001.

U.S. Appl. No. 12/110,677 Notice of Allowance, dated May 13, 2011.

* cited by examiner

LABEL SWITCHED PATH OAM WRAPPER

CROSS REFERENCE TO RELATED APPLICATIONS

This application is a continuation of application Ser. No. 12/110,677, filed Apr. 28, 2008, which is a continuation of application Ser. No. 10/032,014, filed Dec. 31, 2001.

FIELD OF THE INVENTION

The invention relates to communications networks and, more particularly, to methods and devices for determining the performance of network segments in a Multi-Protocol Label Switched (MPLS) network.

BACKGROUND TO THE INVENTION

Today's increasing use of and reliance on communications networks has led to the development of new standards and protocol that provide more reliable and efficient network services to consumers.

A standard that is still developing is MPLS (Multi-Protocol Label Switching). This emerging standard allows packets or any data transmission units (DTUs) to be routed in the MPLS network based simply on a label that the DTU is carrying. This process facilitates the complexity of route lookups that are based on a destination IP (Internet Protocol) address. Thus, a DTU (Data Transmission Unit) arriving at a router is forwarded to another router based merely on the a DTU's label. At the next router, the label of the DTU may be replaced or added to for the next "hop" in the DTU's travel towards its ultimate destination. While the MPLS standard promises great benefits, very few methods have been developed for fault detection/management of an MPLS network.

One solution to the above need has been suggested by ITU-T Y.1711. In this document, discussed is the use of a special Operation And Maintenance (OAM) packet that can be used to determine the performance of an MPLS network. An unused reserved MPLS label value is used at the bottom of the label stack of OAM packets to delineate OAM packets for transport between Label Switch Path (LSP) ingress and egress points. This approach, unfortunately, only allows for performance determination between these ingress and egress points. The performance of network segments between these ingress and egress points is not possible nor even considered in the above proposal. Furthermore, the use of a specific MPLS label value for OAM packets leads to increased overhead costs for this proposal.

By way of explanation, it should be noted that an LSP is a specific data traffic path in an MPLS network. Such LSPs are provided for by LDPs (Label Distribution Protocols) that establish these paths and reserves the necessary resources on the nodes in the path to meet predefined service requirements of the data path. An LSP is analogous to the route that a packet or DTU is tasked to follow in being transmitted from an ingress (entry) LSP node to an egress (exit) LSP node. LSPs are established from the egress LSP node to the ingress LSP node. As such, the egress LSP node uses LDP to distribute the relevant labels to the relevant nodes. Once a DTU arrives at the ingress LSP node, the DTU is thus forwarded to the egress LSP node based on the forwarding decisions dictated by the distributed labels.

An LDP is a specification that allows a label switch router (LSR) to distribute labels to its LDP peers. In MPLS, since DTUs are routed based on the labels carried by the DTUs, the routers (LSR) must know where to route the DTUs based on the labels carried by the DTU. Thus, if an LSR assigns a label A to a class of DTUs, that LSR must notify the other LSRs of the meaning of that label A (i.e. what to do or how to process or route a DTU with label A). This is accomplished by using an LDP. Since a set of labels from the ingress LSR (entry router) to the egress LSR (exit router) in an MPLS network defines a Label Switched Path (LSP), LDPs help in establishing an LSP by using a set of procedures to distribute the labels among the LSP peers (i.e. the ingress LSP and the egress LSPs are peers in that they communicate with each other at the same level—they can change what each has done).

From the above discussion, any solution to the above performance determination problem should ideally make use of the existing infrastructure that adheres to the MPLS standard. Such a solution would not require increased logic to be implemented and should allow for segmentation of LSPs in terms of performance and fault isolation.

It should be noted that the term data transmission unit (DTU) will be used in a generic sense throughout this document to mean units through which digital data is transmitted from one point in a network to another. Thus, such units may take the form of packets, cells, frames, or any other unit as long as digital data is encapsulated within the unit. Thus, the term DTU is applicable to any and all packets and frames that implement specific protocols, standards or transmission schemes. It should also be noted that the term digital data will be used throughout this document to encompass all manner of voice, multimedia content, video, binary data or any other form of data or information that has been digitized and that is transmitted from one point in a network to another as a payload of a data transmission unit.

SUMMARY OF THE INVENTION

The present invention seeks to provide methods for logically segmenting an LSP so that OAM DTUs may be used to determine the performance and/or the status of LSP segments. To segment a previously determined LSP, a dedicated subpath (a logical LSP) within that predetermined LSP is defined between two LSRs that are capable of processing OAM DTUs. The source node (source LSR) establishes a logical LSP between itself and the destination node (destination LSR) using an LDP. In doing this, the logical LSP traverses a specific path and transits through specific nodes in that path. The destination node then transmits an OAM DTU or any other specialized DTU to the source node using a label specifically associated with the logical LSP that was established. The characteristic of the specific path traversed by the logical LSP can thus be determined by when, how, and if the specialized DTU is received by the destination node.

In a first aspect the present invention provides a method of processing an operation and maintenance (OAM) data transmission unit (DTU) in a multi-protocol label switched (MPLS) network at an intermediate node between a source node and a destination node of a first label switched path (LSP), the source node, destination node and intermediate node being capable of processing OAM DTUs. The method comprises: receiving a DTU at the intermediate node, the intermediate node being the defined end point of a second LSP that comprises a segment of the first LSP; identifying that a top level label of the DTU is a label assigned to the second LSP; determining that the DTU has been received on the second LSP based on the label assigned to the second LSP; and in response to identifying the label assigned to the second LSP, determining that a label in the DTU following the label assigned to the second LSP is a label indicating the DTU is an OAM DTU.

In a second aspect the present invention provides an intermediate node between a source node and a destination node of a first label switched path (LSP), the source node, destination node and intermediate node being capable of processing OAM DTUs. The intermediate node comprises: an interface for receiving a DTU, the intermediate node being the defined end point of a second LSP that comprises a segment of the first LSP; and a processor configured to: identify that a top level label of the DTU is a label assigned to the second LSP; determine that the DTU has been received on the second LSP based on the label assigned to the second LSP; and in response to identifying the label assigned to the second LSP, determine that a label in the DTU following the label assigned to the second LSP is a label indicating the DTU is an OAM DTU.

In a third aspect the present invention provides a system for measuring the performance of a segment of a first Label Switched Path (LSP) in a multi-protocol label switched (MPLS) network. The system comprises: a source and destination node of a first LSP that are capable of processing OAM DTUs; and an intermediate node that is capable of processing OAM DTUs and is the defined end point of a second LSP that comprises a segment of the first LSP, the intermediate node configured to: receive a DTU; identify that a top level label of the DTU is a label assigned to the second LSP; determine that the DTU has been received on the second LSP based on the label assigned to the second LSP; and in response to identifying the label assigned to the second LSP, determine that the next label in the DTU following the label assigned to the second LSP is a label indicating the DTU is an OAM DTU.

In a fourth aspect the present invention provides a method of segmenting a predefined path through a network that only allows unidirectional transmission. The method comprises: a) determining which nodes on the network are on the predefined path; b) defining segment nodes that define beginning and ending nodes for a network segment; and c) configuring a network segment between beginning and ending nodes by instructing intervening nodes on how to forward data transmission units configured for that network segment.

In a fifth aspect the present invention provides a network router for routing data transmission units (DTUs) in a domain which only allows unidirectional flow. The router includes: a receiving module for receiving DTUs; a transmitting module for transmitting DTUs; a switch core module placed between the receiving module and the transmitting module for routing DTUs between the receiving and the transmitting modules; and a diagnostic module for determining a performance of a network path of the domain, the diagnostic module being for processing specialized DTUs received by the receiving module and for creating specialized DTUs to be transmitted by the transmitting module, wherein the router executes computer readable and computer executable instructions for implementing a method for determining the performance of the network path, the method including: a) if the network router is a source node for the network path, transmitting the specialized DTUs to a destination node; and b) if the network router is a destination node for the network path, receiving the specialized DTUs and performing an action chosen from the group consisting of: b1) calculating the performance of the network path based on data contained in the specialized DTU; and b2) determining if there is a fault on the network path based on whether a specialized DTU is received within a given amount of time.

In a sixth aspect, the present invention provides

BRIEF DESCRIPTION OF THE DRAWINGS

A better understanding of the invention may be obtained by reading the detailed description of the invention below, in conjunction with the following drawings, in which.

DETAILED DESCRIPTION

For this document, the term "OAM-capable" will be understood to mean capable of processing OAM DTUs or some other specialized DTU used for maintenance and/or performance determination purposes. Processing such DTUs may involve producing such DTUs, determining network segment performance from the DTUs and determining network or network segment faults by the receipt or non-receipt of such DTUs. Based on the above, a "non-OAM capable" node will thus be nodes that are unable to process such specialized DTUs.

Figure 1:
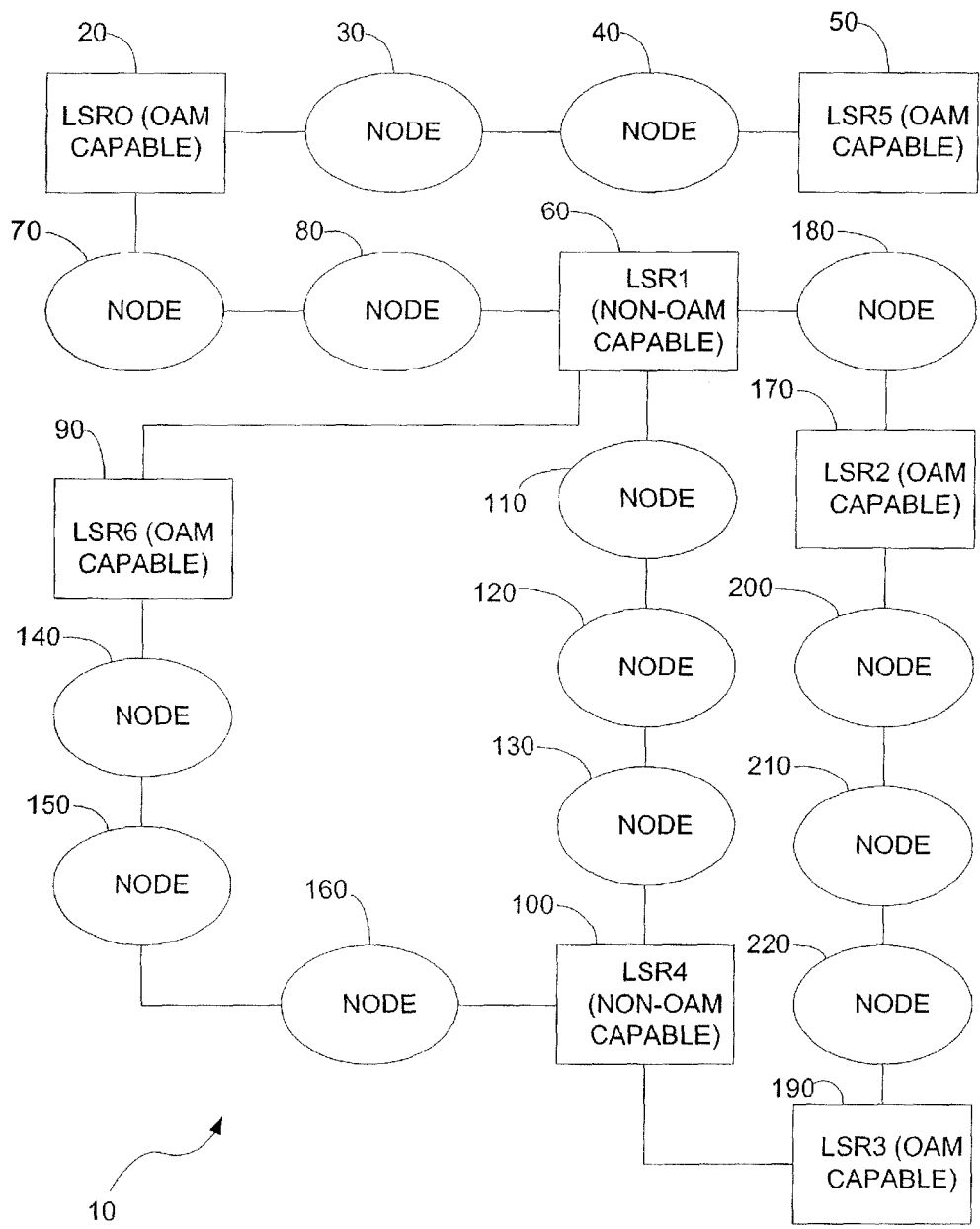
FIG. 1 is a block diagram of an MPLS network using label switched routers.

Referring to FIG. 1, a schematic block diagram of an MPLS network 10 is illustrated. A first OAM capable LSR 20 (LSR0) is coupled to a node 30. The node 30 is coupled to another node 40 which, in turn, is coupled to a second OAM capable LSR 50 (LSR5). At another end of LSR 20, a non OAM capable LSR 60 (LSR1) is coupled to LSR 20 through two intervening nodes 70, 80. This non-OAM capable LSR 60 is also coupled to another OAM capable LSR 90 (LSR6) with no intervening nodes in between. At another port of LSR 60, another non-OAM capable LSR 100 (LSR4) is coupled to LSR 60 with three intervening nodes 110, 120, 130 in between. This LSR 100 is coupled, in turn, to LSR 90 with three intervening nodes 140, 150, 160 in between. At yet another port of LSR 60, this LSR 60 is coupled to an OAM capable LSR 170 (LSR2) through one intervening node 180. Between LSR 170 and an OAM capable LSR 190 (LSR3) are three intervening nodes 200, 210, 220. The LSR 190 is also coupled to LSR 100 at another of its ports.

It should be noted that intervening nodes 30, 40, 70, 80, 180, 140, 150, 160, 110, 120, 130, 200, 210, 220 are not of interest and are merely network nodes that are non-OAM capable. For non-OAM capable nodes and LSRs OAM is transparent to these nodes and LSRs. These nodes are provided as illustration that other nodes may be present between the relevant LSRs.

With the network 10 as illustrated in FIG. 1, previously suggested solutions to the problem outlined above would only be capable of determining end-to-end performance between an ingress LSR and an egress LSR of an LSP. If the LSP was a path from LSR0 to LSR3, with the LSP passing through LSR1 and LSR2, then only the performance for the whole path can be found. The isolation of any faults in that path is not possible. Thus, if the node 180 were to fail, then a user would only know that the LSP between LSR0 and LSR3 has failed and that user would not be able to isolate the problem to any specific portion of the path.

Segmentation of the MPLS network is achieved by configuring logical LSPs within a given LSP. If the example given above of an LSP with LSR0 as an ingress LSR and LSR3 as an egress LSR is taken, logical subsidiary LSPs can be created within this LSP. Since this LSP passes through an OAM capable LSR, LSR2, this LSR can be the breakpoint within the larger LSP. Thus, a subsidiary logical LSP between LSR0 and LSR2 can be created and another subsidiary logical LSP segment between LSR2 and LSR3 can be created.

By setting up a local LSP segment between LSR0 and LSR2, any faults in that network segment can therefore be isolated. Similarly, if there is a fault between LSR2 and LSR3, then the fault can be isolated to that segment. If the MPLS network cannot be segmented between the ingress LSR0 and the egress LSR3, then any fault between these two LSRs cannot be localized. If the MPLS network can be segmented, then by checking each segment the problem can be isolated.

To segment the LSP between LSR0 and LSR3, the source node, in this case LSR0, would create an LSP segment between itself, LSR0, and the closest OAM capable LSR. In this case the nearest OAM capable LSR would be LSR2. An LSP segment between LSR0 and LSR1 would not be of any use given that LSR1 cannot process the OAM or specialized DTU. To provision this first LSP segment, LSR0 would use the LDP to notify all the nodes between itself and the destination node that a new LSP segment has been established and that any DTUs carrying the label that is assigned to the new LSP segment must be processed accordingly. With the first subsidiary LSP established, a second LSP segment can be created between LSR2 and LSR3. This second LSP segment would be useful as it is between OAM capable LSRs. It should be clear that these LSP segments are being defined within an LSP that has been previously established. The LSP segments are denoted as an attribute of this previously established LSP. The LSP segments are defined when the original LSP is defined. In effect, an "OAM wrapper" is established for each possible segment as an attribute of that LSP. Thus, if a path for an LSP changes, the new labels distributed to setup the new path will carry with it the OAM wrapper attribute of the LSP. LSP segments are defined and for each LSP segment delimited by OAM capable LSRs or non-OAM LSP segments (e.g. LSR1 in FIG. 1), an OAM wrapper can be established. Thus, in FIG. 1, the LSP segment defined between OAM capable LSRs, LSR2 and LSR3 can have an OAM wrapper associated with it. Similarly, the LSP segment between LSR0 and LSR2 can have its own OAM wrapper associated with it.

To establish the second LSP segment the source node, either of LSR2 or LSR3, can initiate the process by provisioning for the LSP segment and using LDP to notify the nodes between itself and the destination LSR how DTUs with the label for this second LSP segment will be processed. Once these two LSP segments are established, it should be clear that any problems in the original LSP between LSR0 and LSR3 can be localized to either of the two LSP segments. If there is a problem in the original LSP then this problem may be localized by using the LSP segments to pinpoint the problem. The first LSP segment between LSR0 and LSR2 can be activated and LSR0 can send a specialized fault detection DTU or a regular OAM DTU to LSR2 to determine if the fault is within that segment of the original LSP. Simultaneously, the second LSP segment between LSR2 and LSR3 can be examined by having the destination node send a similar fault detection or OAM DTU to the destination LSR to determine if the fault is within that segment. By this process of segmentation and elimination, faults along a previously determined LSP can be localized and isolated.

Again taking FIG. 1 as an example, the OAM wrappers that can be established are as follows:
OAM Wrapper A:
  between LSR0 (ingress) and LSR5 (egress)
OAM Wrapper B:
  between LSR6 (ingress) and LSR3 (egress)
OAM Wrapper C:
  between LSR1 (ingress) and LSR2 (egress)
OAM Wrapper D:
  between LSR2 (ingress) and LSR3 (egress)

Figure 1A:
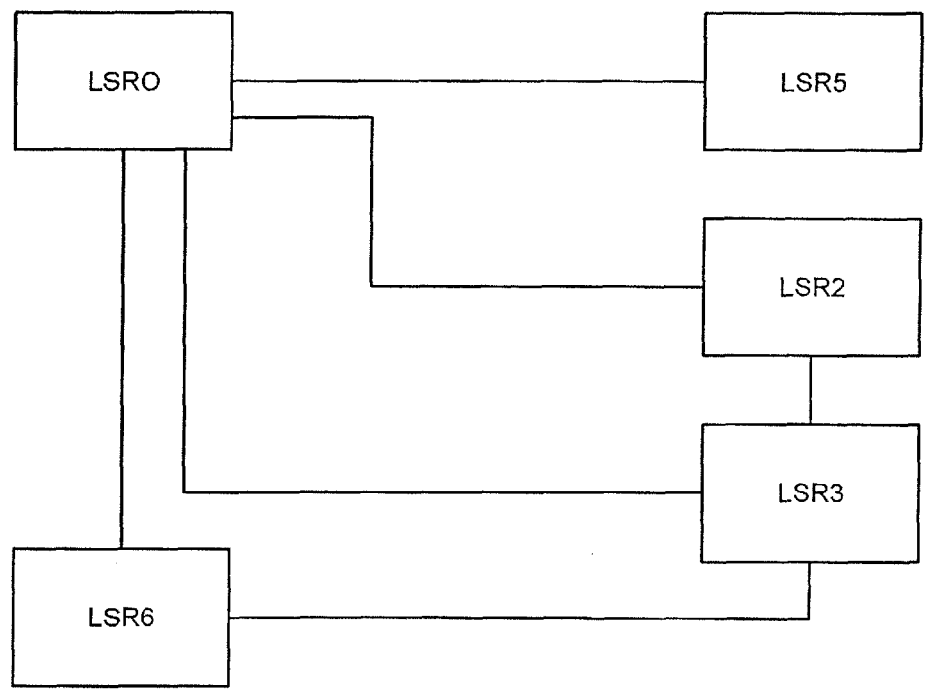
FIG. 1A is a block diagram illustrating the logical adjacencies allowed by OAM wrappers.

The OAM wrapper establishes logical adjacencies between LSRs that are equipped with OAM capabilities for performance measurement and fault isolation. The ingress and egress points are set out clearly in the OAM wrapper setup to account for the unidirectional nature of MPLS. The logical links or adjacencies between the OAM capable LSRs are illustrated in FIG. 1A. As can be seen in FIG. 1A, LSR0 is logically adjacent to LSR5, LSR2, LSR3, and LSR6 for OAM purposes. Furthermore, LSR6 is logically adjacent to LSR3 and LSR2 is also logically adjacent to LSR3 for OAM purposes. The intervening nodes between these LSRs are non-OAM capable and are thus transparent to the OAM DTUs and are not included in FIG. 1A. Also, since LSR1 and LSR4 are non-OAM capable, these are also transparent to OAM and OAM DTUs and are not included in FIG. 1A.

As part of the establishment of a LSP segment, at least one label has to be assigned to the LSP segment. This involves the establishing node, usually the source LSR, choosing a label in the LSP segment. Once this label is chosen, it is then assigned to the LSP segment. Once assigned, the label can then be inserted into the OAM DTU. It should be noted that this assignment is communicated to the other nodes using LDP. This way the other nodes are notified of the new label and of the new LSP segment.

To ensure that a LSP segment will traverse a specific path through the network, the LSP segment can be configured to proceed along a specific path. As an example, if an LSP between LSR0 and LSR3 is configured to travel any path between LSR0 and LSR3 then multiple possibilities exist for this path. For example a DTU on that LSP, which we can label as the primary LSP, can take the path from LSR0 to LSR1, then to LSR6, LSR4, and finally, to LSR3. Or, that same DTU may take the path from LSR0 to LSR1, then to LSR2, and finally to LSR3. As a third path the DTU could travel from LSR0, in to LSR1, LSR4, and, finally, to LSR3. Clearly, to perform fault management and/or performance determination and management on the primary LSP between LSR0 and LSR3 in this configuration can be difficult. However, if LSPs segments are created between the OAM capable LSRs in this configuration, then both fault management and performance determination is simplified. As an example, an LSP subsidiary can be created between LSR0 and LSR6 passing through LSR1. Similarly, a LSP segment can be created between LSR6 and LSR3 passing through LSR4. Also, an LSP segment can be created between LSR0 and LSR3 passing through LSR1 and LSR4. To ensure that the correct path is being created and examined, the LSP between the OAM capable LSRs can be created to follow a very specific path. As an example, an LSP segment between LSR6 and LSR3 can be created by using LDP to notify all the nodes that a DTU passing through this LSP must pass through node 140, 150, 160 and LSR4. Similarly, if an LSP segment between LSR0 and LSR3 is to be created to test the links between LSR1 and LSR4, then this LSP segment should be configured such that any DTU on this LSP must pass through nodes 110, 120, and 130.

Concerning the OAM DTU that may be transmitted from a source node to a destination node, this OAM DTU can be created in a well known manner and designed according to a user's specific need. To further clarify it should be noted that a source node and a destination node are ideally OAM capable LSRs. An LSR is a node that can route traffic based on their labels.

The OAM DTU can be as simple as a DTU that has a date and time stamp of when the DTU was transmitted from a source node. This OAM DTU, when received by the destination node, is processed by merely reading the date and time stamp and comparing that with the date and time at which the OAM DTU was received at the destination node. By doing this comparison, the transit time from the source node to the destination node can be determined as long as, of course, the clocks in the source node and the destination node are substantially synchronized. For fault isolation, the source node can send a confirmation OAM DTU to a destination node. The faults on the LSP segment can be found if the confirmation DTU is not received by the destination node. This fault detection can be continuously carried out with the source node of the LSP segment sending a confirmation OAM DTU to the multiple destination nodes at a specified rate. The destination node can, based on the average transit time for an OAM DTU, determine if the source node transmitting the confirmation OAM DTUs is still communicating. If a destination node does not receive a confirmation OAM DTU within a predetermined amount of time after the previous confirmation OAM DTU, then the destination node may decide to issue a warning that a fault on the LSP segment of the primary LSP is present. This will therefore allow users and/or network management software to look further into the matter.

Figure 2:
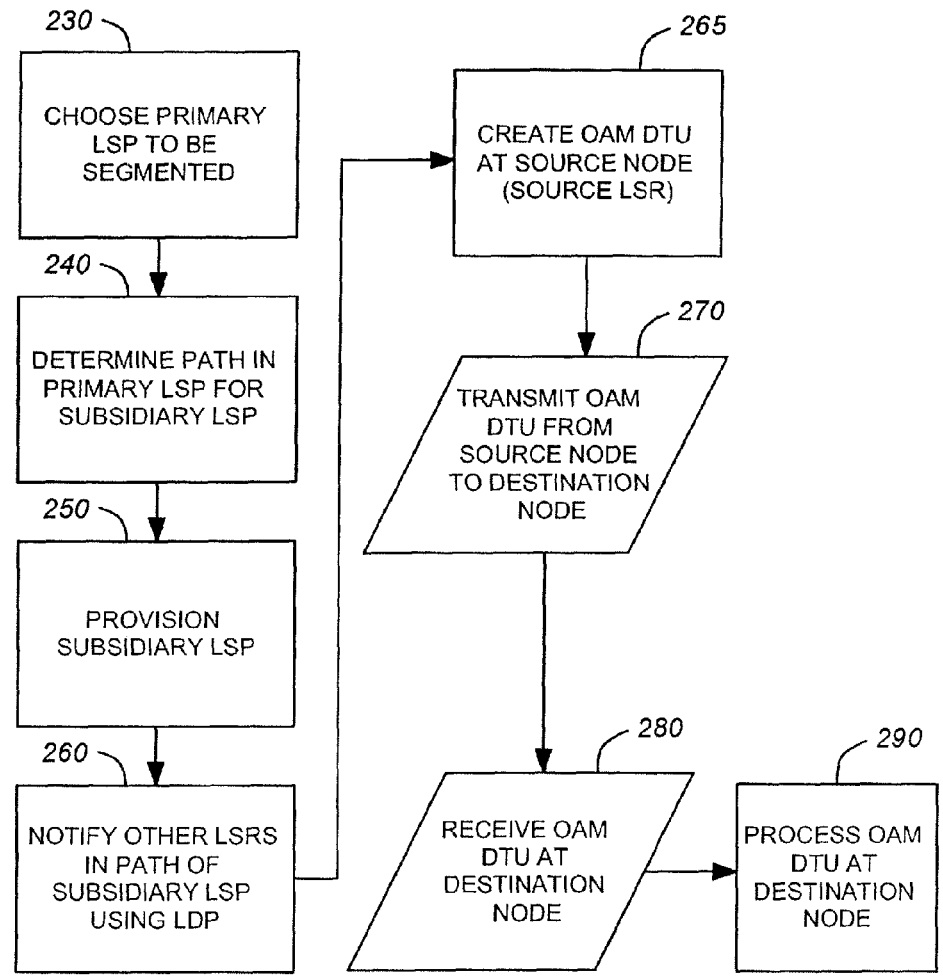
FIG. 2 is a flowchart illustrating the steps in a method according to one aspect of the invention.

FIG. 2 is a flow chart illustrating the steps taken in the process outlined above. The first step is step 230. This step chooses the primary LSP to be segmented. Step 240 determines the path in the primary LSP for an LSP segment. As an example, in FIG. 1, if the primary LSP is from LSR0 to LSR3 then the second step would be to determine whether the LSP segment passes through LSR0, LSR1, and LSR2, through LSR0, LSR1, LSR4, or through LSR0, LSR1, LSR6 and LSR4 and, finally, LSR 3. After this, the next step (step 250) is that of provisioning or allowing for an LSP segment to be established. This step involves determining the label to be assigned to the LSP segment and allocating resources for this label to be assigned. Step 260 involves notifying the other nodes and LSRs in the MPLS network about the LSP segment being created. This notification is normally done using LDP. This notification notifies the nodes in the path of the LSP segment about how packets having the label assigned to that LSP segment is to be forwarded and or processed.

Once the LSP segment has been setup by assigning the label for that LSP and by notifying the nodes in the LSP segment, the source node or the source LSR can now create the OAM DTU and/or the specialized DTU for transmission to the destination node (step 265). Step 270 is then that of actually transmitting the OAM DTU from the source node to the destination node along the LSP segment. Step 280 receives the OAM DTU at the destination node. This step assumes that the OAM DTU arrives at the destination node and that there is no fault along the LSP segment. Finally, step 290 is that of processing the OAM DTU at the destination node to determine the performance of the LSP segment and/or to determine the configuration of the LSP segment.

Figure 3:
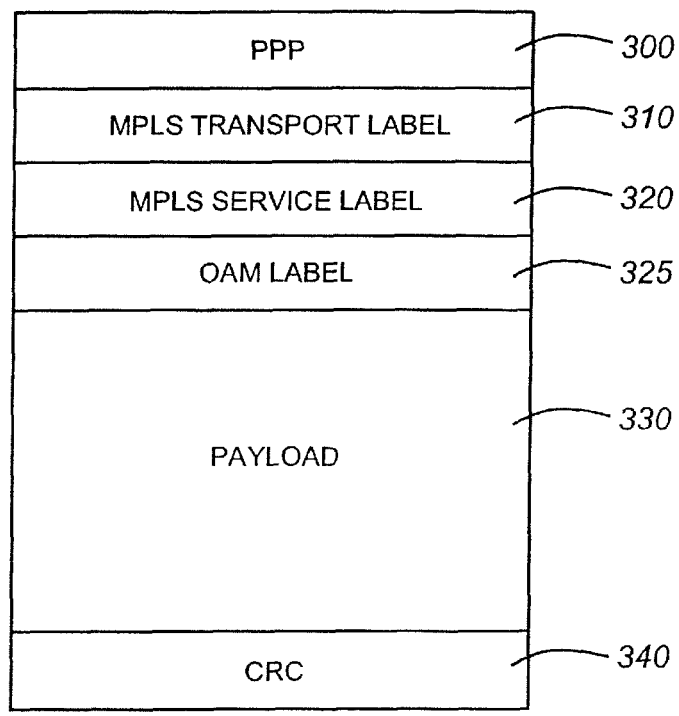
FIG. 3 is a diagram of the fields in an MPLS DTU which may be used for transporting OAM data between LSRs.

Referring to FIG. 3, a possible format for MPLS DTUs is illustrated. As can be seen, a PPP (Point-to-Point Protocol) field 300 provides for data related to the PPP protocol while a transport label field 310 and a service label field 320 allows the DTU to be used in an MPLS domain. The contents of the transport label field 310 determines the routing of the DTU while the contents of the service label field 320 determines the service or processing provided to the DTU. The OAM label field 325 carries an OAM label which signals to the destination node that it is an OAM DTU. The inclusion of this field is in accordance with the document ITU-T.1711. The payload 330 contains any data to be transported while the CRC field 340 provides error correction for the DTU. If the DTU is to be used as an OAM DTU, then any data which may be needed by an OAM DTU may be placed in the payload field 330. The OAM wrapper discussed above would be evidenced by an OAM label in the OAM label field 325. An OAM capable LSR which processes the DTU would recognize the specialized OAM label and process the DTU accordingly. Non-OAM capable nodes (such as nodes 140, 150 in FIG. 1) would not recognize the specialized OAM label and would merely forward the OAM DTU to the next node.

Figure 4:
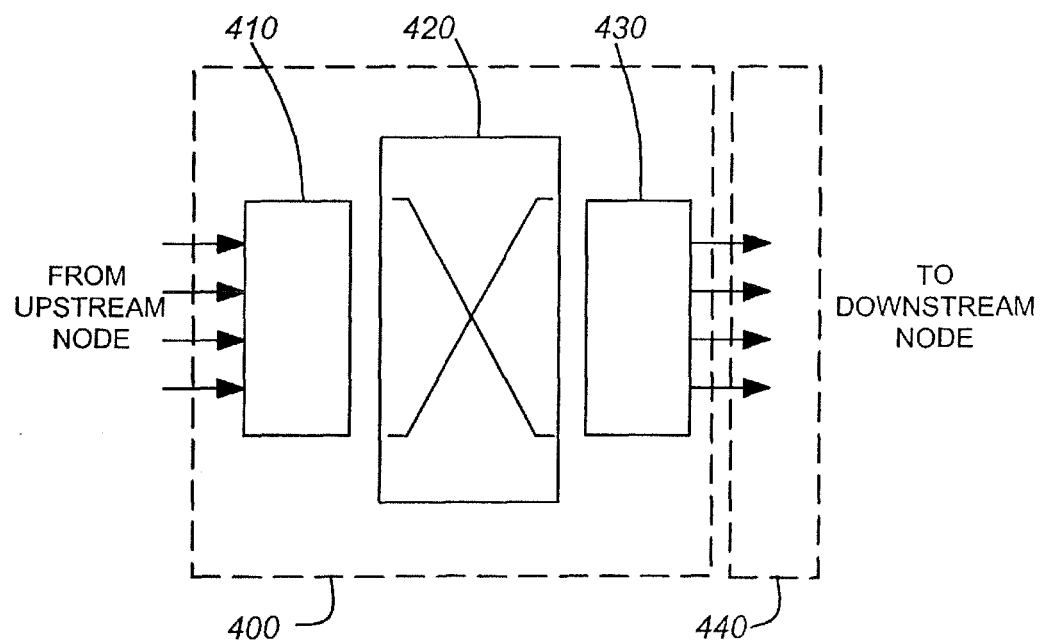
FIG. 4 is a block diagram of the components a Label Switched Router (LSR) which may be used to implement one aspect of the invention.

Referring to FIG. 4, illustrated is a block diagram of an OAM capable MPLS router (LSR) which may use the invention.

As can be seen in FIG. 4, the router 400 has three main components: an input module 410, a switch core 420, and an output module 430. The input module 410 receives DTUs from upstream nodes. The switch core 420 then switches these DTUs to the proper egress ports on the output module 430. Prior to forwarding the received DTU, the LSR processes the DTU. If the DTU is an OAM DTU, then the LSR may respond to the OAM DTU to indicate that the OAM DTU has arrived. It is at this point that the router implements the invention as explained above. The implementation can be carried out by the output module 430 prior to transmitting the OAM DTUs across the MPLS domain. Alternatively, an extra OAM module 440 may be provided between the output module that would process the OAM DTUs and ensure that such OAM DTUs are properly processed, sent or responded to. Furthermore, such an OAM module would ensure that the MPLS transport of the OAM DTUs is properly provisioned. To this end, the OAM module would handle the signalling and LDP execution to implement the invention. The OAM module would therefore perform the processing, signalling, encapsulation, and service label allocation that are outlined above. It should be clear that the above description for FIG. 4 applies to a source node for an OAM DTU. This source node LSR would originate and transmit the OAM DTU to a destination LSR that would receive the OAM DTU.

If the OAM capable LSR is a destination node, the parts of this destination node are the same as those illustrated in FIG. 4 except that the MPLS module would be placed such that the receive module 410 is between the MPLS module 440 and the switch core 420. Such a destination node would receive OAM DTUs and, prior to processing them as regular DTUs, would process them as OAM DTUs.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiment of the invention may be implemented as a combination of both software (e.g. a computer program product) and hardware. Still other embodiments of the invention may be implemented as entirely hardware, or entirely software (e.g. a computer program product).

What is claimed is:

1. A method of processing an operation and maintenance (OAM) data transmission unit (DTU) in a multi-protocol label switched (MPLS) network at an intermediate node between a source node and a destination node of a first label switched path (LSP), the source node, destination node and intermediate node being capable of processing OAM DTUs, the method comprising:
   receiving a DTU at the intermediate node, the intermediate node being a defined end point of a second LSP that comprises a segment of the first LSP;
   identifying that a top level label of the DTU is a label assigned to the second LSP;
   determining that the DTU has been received on the second LSP based on the label assigned to the second LSP; and
   in response to identifying the label assigned to the second LSP, determining that a label in the DTU following the label assigned to the second LSP is a label indicating that the DTU is an OAM DTU.

2. The method of claim 1 further comprising removing the label assigned to the second LSP.

3. The method of claim 1 wherein the OAM DTU comprises a time stamp.

4. The method of claim 3 further comprising determining a transit time of the OAM DTU based on the time stamp.

5. The method of claim 1 wherein the OAM DTU is transmitted by the source node.

6. The method of claim 1 further comprising calculating a performance of the segment of the first LSP based on data contained in the OAM DTU.

7. The method of claim 1 wherein the second LSP is established using a Label Distribution Protocol.

8. The method of claim 1 further comprising determining that the label indicating that the DTU is an OAM DTU is a last label in the DTU.

9. The method of claim 1 wherein the label indicating that the DTU is an OAM DTU is an OAM label.

10. An intermediate node between a source node and a destination node of a first label switched path (LSP), the source node, destination node and intermediate node being configured to process operation and maintenance (OAM) data transmission units (DTUs), the intermediate node comprising:
    an interface configured to receive a DTU, the intermediate node being a defined end point of a second LSP that comprises a segment of the first LSP; and
    a processor configured to:
       identify that a top level label of the DTU is a label assigned to the second LSP;
       determine that the DTU has been received on the second LSP based on the label assigned to the second LSP; and
       in response to identifying the label assigned to the second LSP, determine that a label in the DTU following the label assigned to the second LSP is a label indicating that the DTU is an OAM DTU.

11. The intermediate node of claim 10 wherein the processor is further configured to remove the label assigned to the second LSP.

12. The intermediate node of claim 10 wherein the processor is further configured to identify a time stamp in the OAM DTU.

13. The intermediate node of claim 12 wherein the processor is further configured to determine a transit time of the OAM DTU based on the time stamp.

14. The intermediate node of claim 10 wherein the processor is further configured to calculate a performance of the segment of the first LSP based on data contained in the OAM DTU.

15. The intermediate node of claim 10 wherein the second LSP is established using a Label Distribution Protocol.

16. The intermediate node of claim 10 wherein the processor is further configured to determine that the label indicating that the DTU is an OAM DTU is a last label in the DTU.

17. The intermediate node of claim 10 wherein the label indicating that the DTU is an OAM DTU is an OAM label.

18. A system for measuring the performance of a segment of a first Label Switched Path (LSP) in a multi-protocol label switched (MPLS) network, the system comprising:
    a source and destination node of a first LSP that are configured to process operation and maintenance(OAM) data transmission units (DTUs); and
    an intermediate node that is configured to process OAM DTUs and is the defined end point of a second LSP that comprises a segment of the first LSP, the intermediate node also configured to:
       receive a DTU;
       identify that a top level label of the DTU is a label assigned to the second LSP;
       determine that the DTU has been received on the second LSP based on the label assigned to the second LSP; and
       in response to identifying the label assigned to the second LSP, determine that a next label in the DTU following the label assigned to the second LSP is a label indicating that the DTU is an OAM DTU.

19. The system of claim 18 wherein the intermediate node is further configured to remove the label assigned to the second LSP.

20. The system of claim 18 wherein the intermediate node is further configured to identify a time stamp in the OAM DTU.

21. The system of claim 20 wherein the intermediate node is further configured to determine a transit time of the OAM DTU based on the time stamp.

22. The system of claim 18 wherein the source node is configured to transmit the OAM DTU.

23. The system of claim 18 wherein the intermediate node is further configured to calculate a performance of the segment of the first LSP based on data contained in the OAM DTU.

24. The system of claim 18 wherein the second LSP is established using a Label Distribution Protocol.

25. The system of claim 18 wherein the intermediate node is further configured to determine whether the label indicating the DTU is an OAM DTU is a last label in the DTU.

26. A network router for routing data transmission units (DTUs) in a domain which only allows unidirectional flow, the router including:
- a receiving module configured to receive DTUs;
- a transmitting module configured to transmit DTUs;
- a switch core module placed between the receiving module and the transmitting module, the switch core module configured to route DTUs between the receiving and the transmitting modules; and
- a diagnostic module configured to determine a performance of a network path of the domain, the diagnostic module further configured to process specialized DTUs received by the receiving module and create specialized DTUs to be transmitted by the transmitting module,
- the router being configured to execute computer readable and computer executable instructions for implementing a method for determining the performance of the network path, the method including:
  - a) if the network router is a source node for the network path, transmitting the specialized DTUs to a destination node; and
  - b) if the network router is a destination node for the network path, receiving the specialized DTUs and performing an action chosen from a group consisting of:
    - b1) calculating a performance of the network path based on data contained in the specialized DTU; and
    - b2) determining if there is a fault on the network path based on whether a specialized DTU is received within a given amount of time.

27. The network router of claim 26 wherein the network path is in a multi-protocol label switched (MPLS) network.

28. The network router of claim 27 wherein the specialized DTU is an operation and maintenance (OAM) DTU.

29. The network router of claim 26 wherein the specialized DTU is an operation and maintenance (OAM) DTU.

\* \* \* \* \*